(12) United States Patent
Daout

(10) Patent No.: US 7,969,825 B2
(45) Date of Patent: Jun. 28, 2011

(54) BACKLASH-COMPENSATING TOOTHED MOVING PART, GEAR ASSEMBLY AND USE OF THIS GEAR ASSEMBLY

(75) Inventor: Jerome Daout, Rolle (CH)

(73) Assignee: Rolex S.A., Geneva (CH)

( * ) Notice: Subject to any disclaimer, the term of this patent is extended or adjusted under 35 U.S.C. 154(b) by 0 days.

(21) Appl. No.: 12/608,458

(22) Filed: Oct. 29, 2009

(65) Prior Publication Data

US 2010/0043578 A1 Feb. 25, 2010

Related U.S. Application Data

(63) Continuation of application No. 10/585,510, filed as application No. PCT/CH2005/000009 on Jan. 11, 2005, now Pat. No. 7,633,837.

(30) Foreign Application Priority Data

Jan. 13, 2004 (EP) .................................. 04405026

(51) Int. Cl.
*G04B 19/02* (2006.01)
*G04B 19/20* (2006.01)
*F16H 57/00* (2006.01)
*F16H 55/14* (2006.01)
(52) U.S. Cl. ............. 368/220; 368/322; 74/411; 74/461
(58) Field of Classification Search .................. 368/76, 368/80, 220, 222, 322–323; 74/461
See application file for complete search history.

(56) References Cited

U.S. PATENT DOCUMENTS

| 820,789 | A | * | 5/1906 | Hutchins ..................... 74/460 |
| 1,460,661 | A | | 7/1923 | De Coninck |
| 1,772,986 | A | * | 8/1930 | Dunham ........................ 74/461 |
| 2,335,504 | A | | 11/1943 | Gazda |
| 3,173,301 | A | | 3/1965 | Miller |
| 3,304,795 | A | | 2/1967 | Rouverol |
| 3,636,792 | A | | 1/1972 | Vigh |
| 3,950,633 | A | | 4/1976 | Kelch et al. |
| 3,999,445 | A | * | 12/1976 | Liautaud ........................ 74/445 |
| 4,127,041 | A | | 11/1978 | Imazaike |

(Continued)

FOREIGN PATENT DOCUMENTS

| EP | 1380772 A | 1/2004 |
| JP | 52133466 A | 11/1977 |
| JP | 63130961 A | 6/1988 |

OTHER PUBLICATIONS

International Search Report of PCT/CH2005/000009/ date of mailing May 6, 2005.

*Primary Examiner* — Vit W Miska
(74) *Attorney, Agent, or Firm* — Westerman, Hattori, Daniels & Adrian, LLP

(57) ABSTRACT

The invention relates to a backlash-compensating toothed moving part, for a precision gear assembly, particularly in clock-making, in which the backlash-compensating teeth each have a section extending symmetrically to both sides of the radius of said mobile passing the tip of said teeth with an elastic connection to said mobile to give said teeth a freedom of movement in the plane of the mobile, at least one tooth in two being a backlash-compensating tooth comprising stop means arranged to limit the freedom of movement as a function of the backlash in the gear assembly to be compensated for.

15 Claims, 8 Drawing Sheets

U.S. PATENT DOCUMENTS

Figure 1:
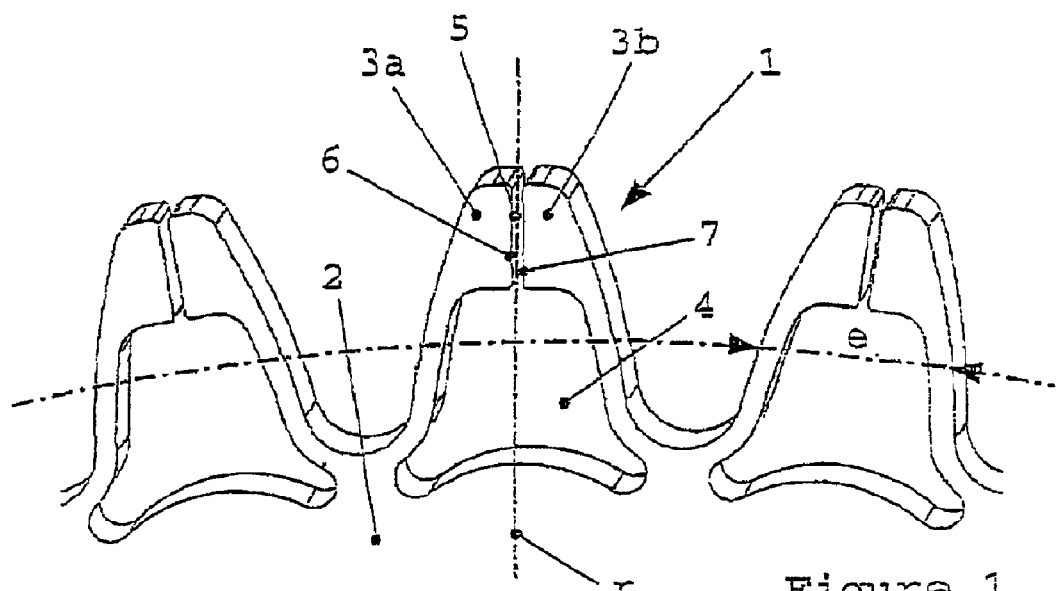

| | | |
|---|---|---|
| 4,473,301 A | 9/1984 | Namyslo |
| 6,872,158 B2 | 3/2005 | Saitoh |
| 7,258,037 B2 | 8/2007 | Wiederrecht |
| 2003/0083166 A1* | 5/2003 | Oertley ......................... 474/162 |

* cited by examiner

US 7,969,825 B2

BACKLASH-COMPENSATING TOOTHED MOVING PART, GEAR ASSEMBLY AND USE OF THIS GEAR ASSEMBLY

This application is a Continuation application of U.S. application Ser. No. 10/585,510, filed Jul. 10, 2006, wherein application Ser. No. 10/585,510 is a national stage application filed under 35 USC §371 of International Application No. PCT/CH2005/000009, filed Jan. 11, 2005, the entire contents of which are incorporated herein by reference.

The present invention relates to a backlash-compensating toothed moving part for a precision gear assembly, particularly of a timepiece, in which the teeth have at least one portion which extends symmetrically on either side of the radius of said moving part passing through the tip of said tooth and which is connected elastically to said moving part so as to provide it with a freedom of movement in the plane of this moving part. This invention also relates to a gear assembly and also to the use of this gear assembly.

Every gear assembly normally has some backlash to allow it to rotate, since it is not possible to find a toothing profile which could operate without backlash.

However, the existence of this backlash has the disadvantage of not being able to provide a desmodromic-type transmission. This is particularly inconvenient in a time-setting wheelwork since the backlash of the motion work gear assembly is always compensated for after setting the time, with the result that the minute hand is not driven until the backlash has been compensated for. This makes it difficult to synchronize the minute hand with the second hand with respect to the hour and minute divisions carried by the dial.

In indirect seconds display mechanisms such as chronographs, since the chronograph hand is not situated in the kinematic chain of the wheelwork under constant tension, which wheelwork is situated between the driving barrel and the escapement, it is necessary to provide a brake to prevent the second hand of the chronograph from fluttering.

This backlash problem is also encountered in all electronic watches with an analog display in which the indicator wheelwork is not under tension.

Moreover, in mechanical watches, although the wheelwork for transmitting the driving force to the escapement is for its part constantly under tension and the problem of engagement backlash therefore does not arise, the movement of this wheelwork is not continuous, but jerky, marked by a number of sudden stoppages followed by accelerations at each step of the escapement wheel, itself controlled by the anchor and the oscillations of the hairspring/balance wheel regulator. The profiles of these accelerations would be able to be modified by the presence of elastic elements between the mating moving parts of a gear assembly, this not being connected with the backlash compensation in a wheelwork under tension, such as the finishing wheelwork.

JP 59-019768 has already proposed a toothed wheel or pinion whose teeth each have a radial slot to make it possible to increase their width so as to eliminate the engagement backlash with the toothed moving part with which it engages. The presence of the radial slots makes it possible, by virtue of the elasticity of the two half-teeth, to vary the width of the teeth in mesh with the teeth of this toothed moving part and to compensate for the backlash normally required for engagement. Such a solution can be used for relatively large toothings, but not for toothings which are as small as those of wristwatch mechanisms in which the thickness of the teeth is around 0.2 mm, the thickness of the wheel plate in which the teeth are cut is between 0.1 and 0.5 mm, and the height of the teeth is around 0.3 mm.

FR 2379736 proposes various solutions with split or cut-out-containing teeth so that they can be deformed to compensate for any off-centering, for any pitch error or for any analogous defect. The solution proposed by this document is above all intended to compensate for errors which are induced in injection-molded plastic toothed wheels as a result of the hard-to-control shrinkage of the plastic material during cooling.

There also exist a number of solutions, used particularly in the printing field, in which the engagement backlash is eliminated using two identical coaxial toothed wheels interconnected by a spring which produces between these two wheels a torque which is greater than the torque to be transmitted, thereby eliminating the engagement backlash. Such a solution is only applicable in a timepiece mechanism at the expense of increasing the overall size.

It can therefore be stated that there is at present no satisfactory solution to the problem of backlash compensation in gear assemblies having small dimensions, such as those of timepieces, particularly wristwatches.

The aim of the present invention is to provide a suitable solution to the specific problem of this type of gear assembly, particularly to the dimensions thereof, and whose toothed wheels are capable of being manufactured on an industrial scale. Another aim of this invention is to modify the acceleration profiles in a wheelwork of a noncontinuous transmission, such as a finishing wheelwork.

To this end, this invention relates to a backlash-compensating toothed moving part for a precision gear assembly, particularly of a timepiece, as claimed in claim 1. It further relates to a gear assembly for a precision mechanism as claimed in claim 8, and also to the use of this gear assembly as claimed in claim 9.

The appended drawings illustrate, schematically and by way of example, various embodiments and their variants of the backlash-compensating toothed moving part and also of the gear assembly which form subjects of the present invention.

Figure 2:
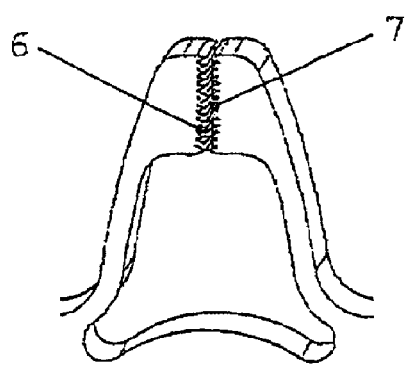
Figure 3:
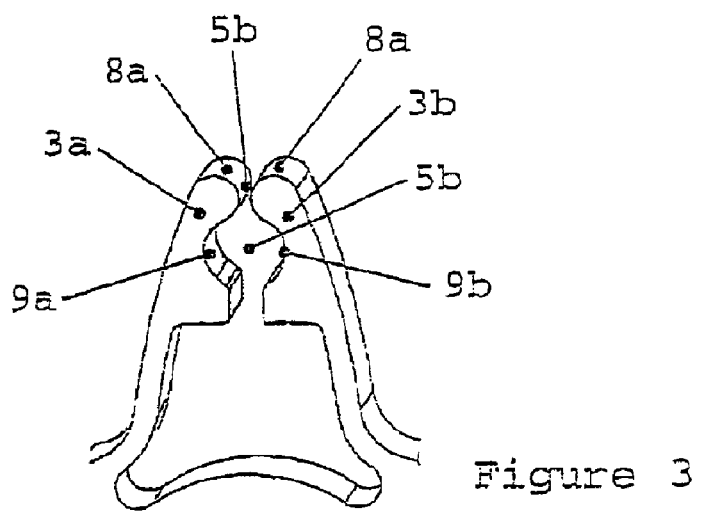
Figure 4:
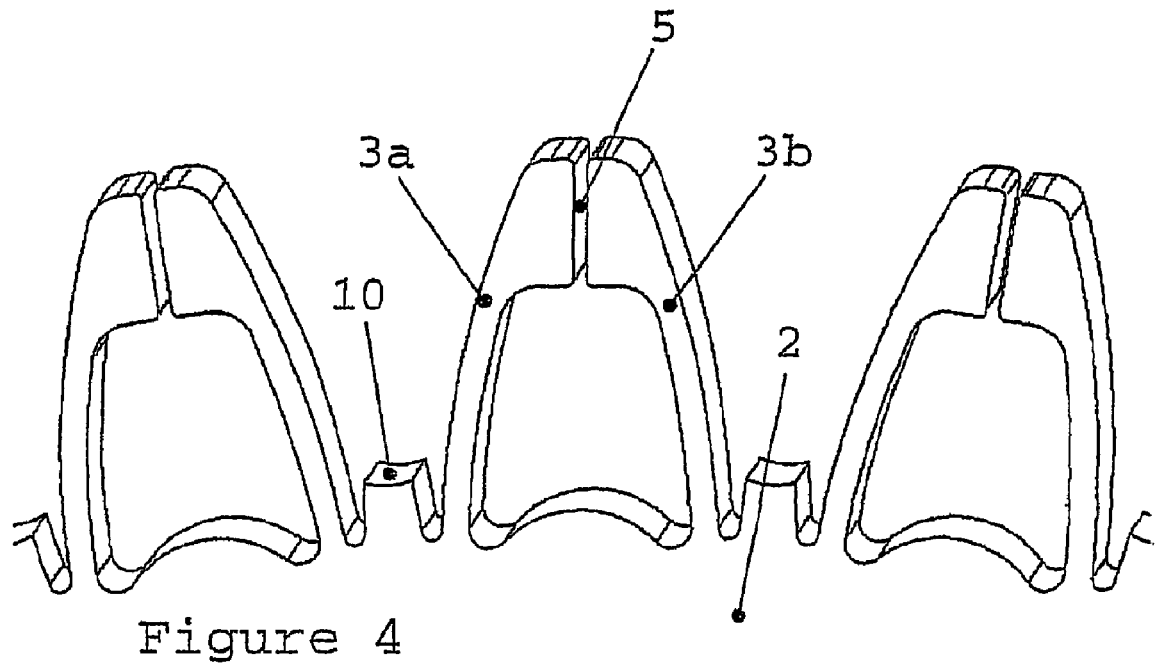
Figure 5:
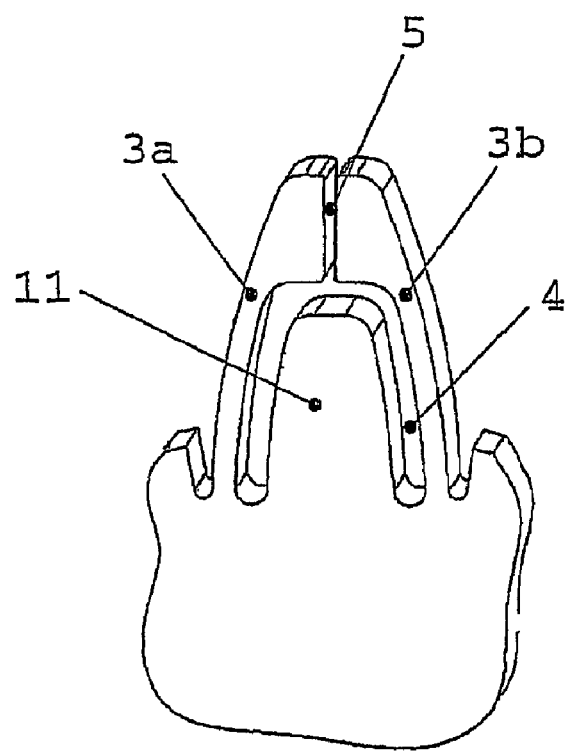
Figure 6:
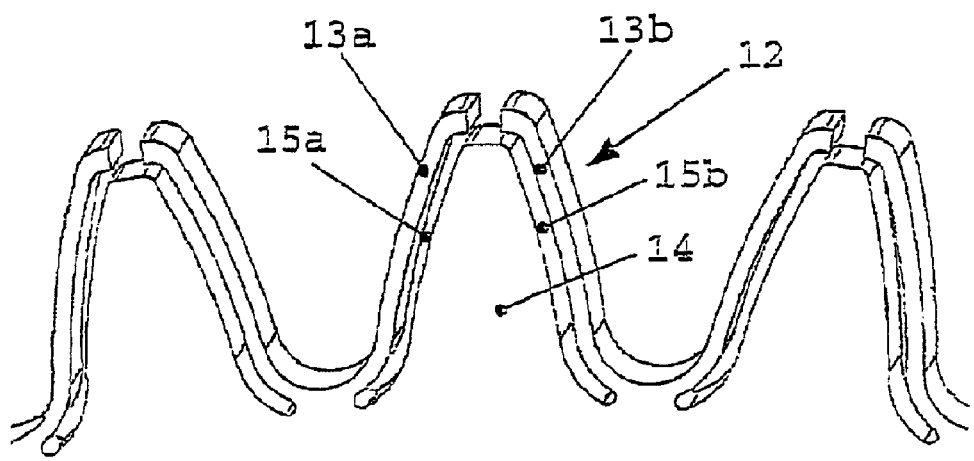
Figure 7:
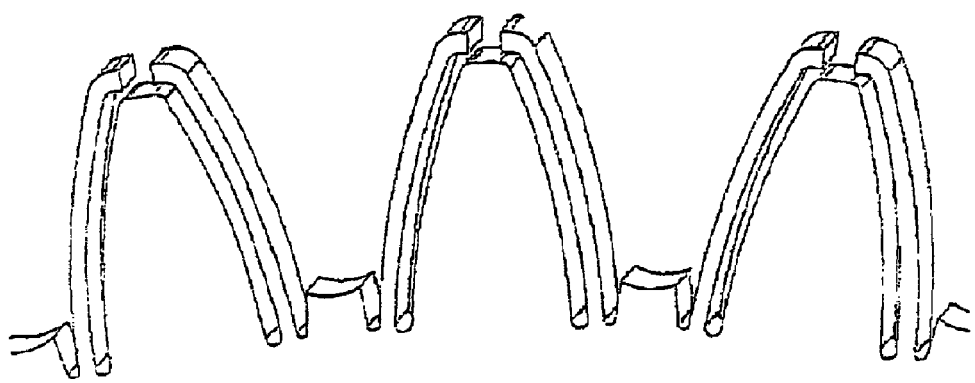
Figure 8:
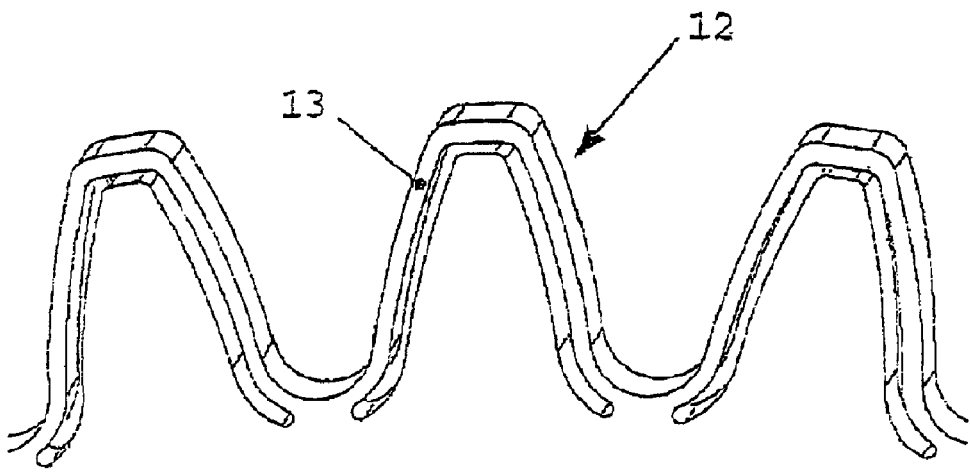
Figure 9:
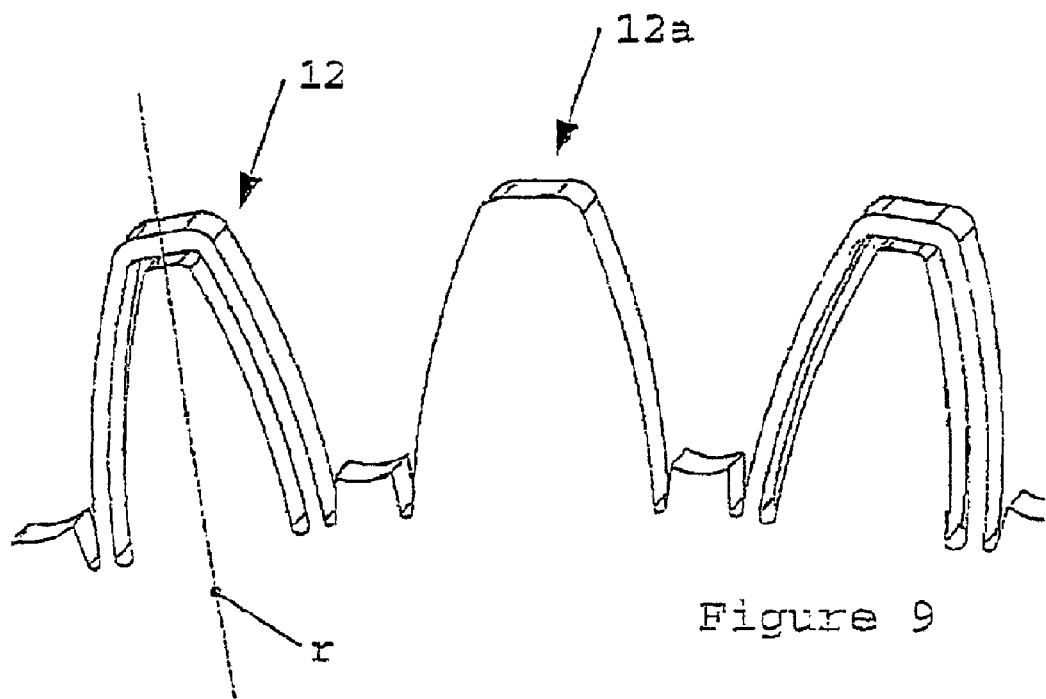
Figure 10:
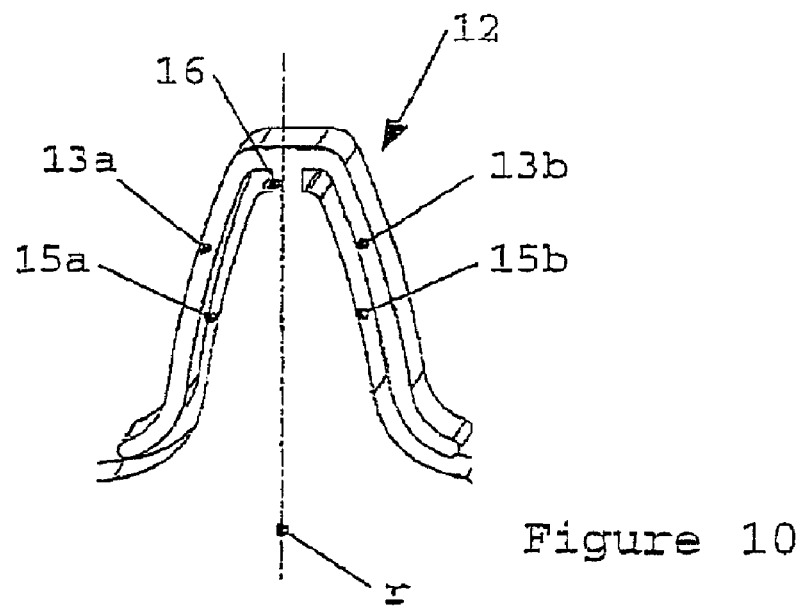
Figure 11:
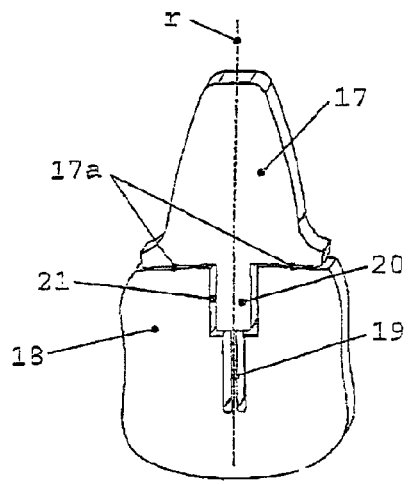
Figure 12:
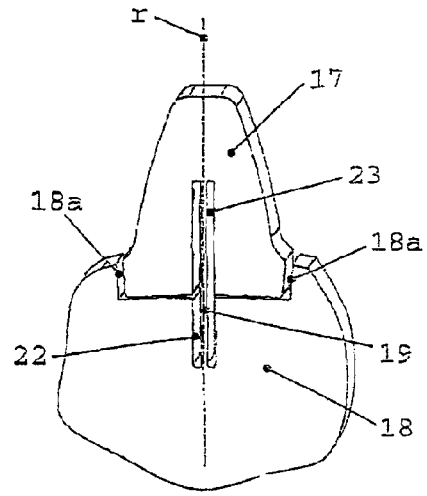
Figure 13:
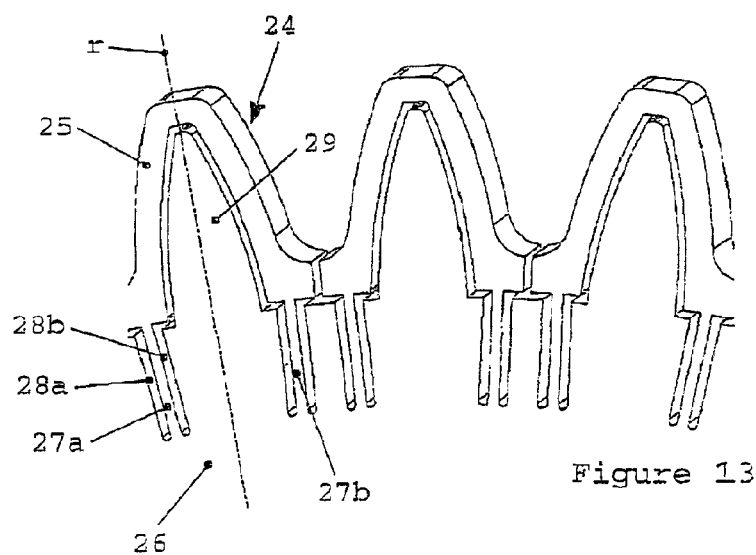
Figure 14:
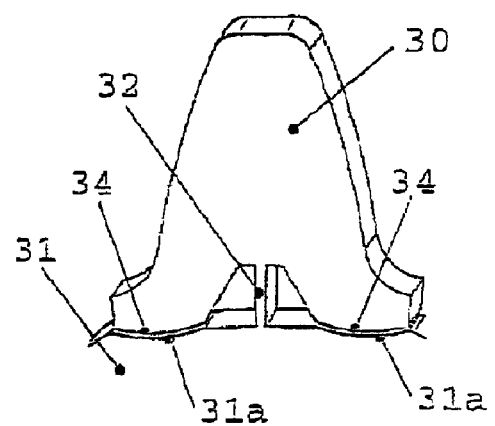
Figure 15:
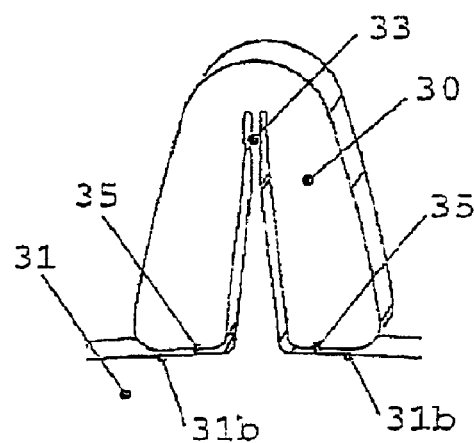
Figure 16:
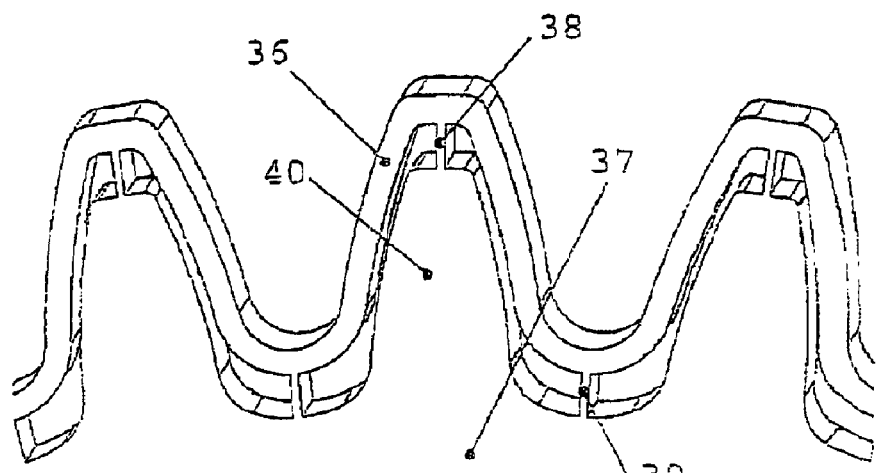
Figure 17:
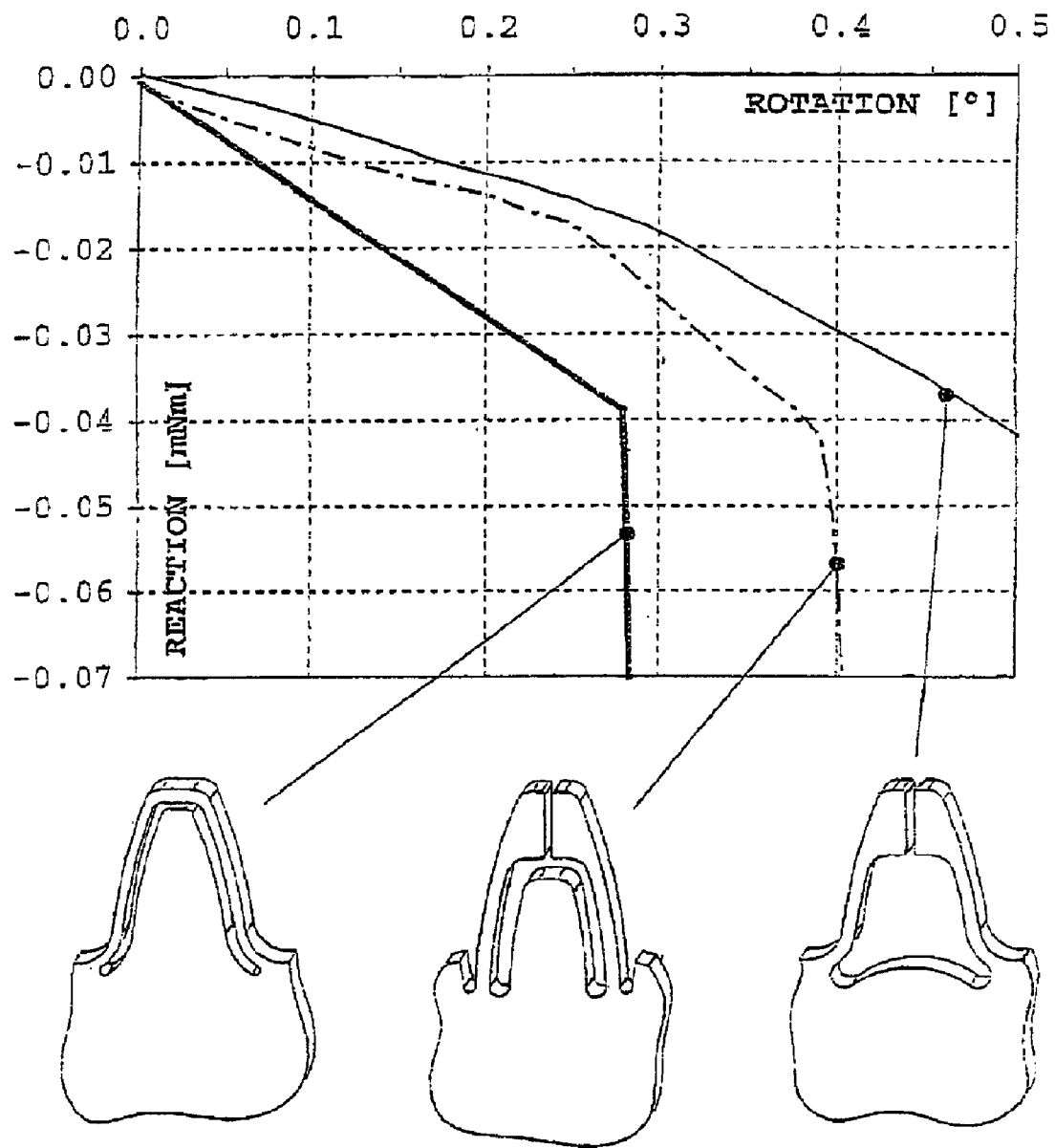
Figure 18:
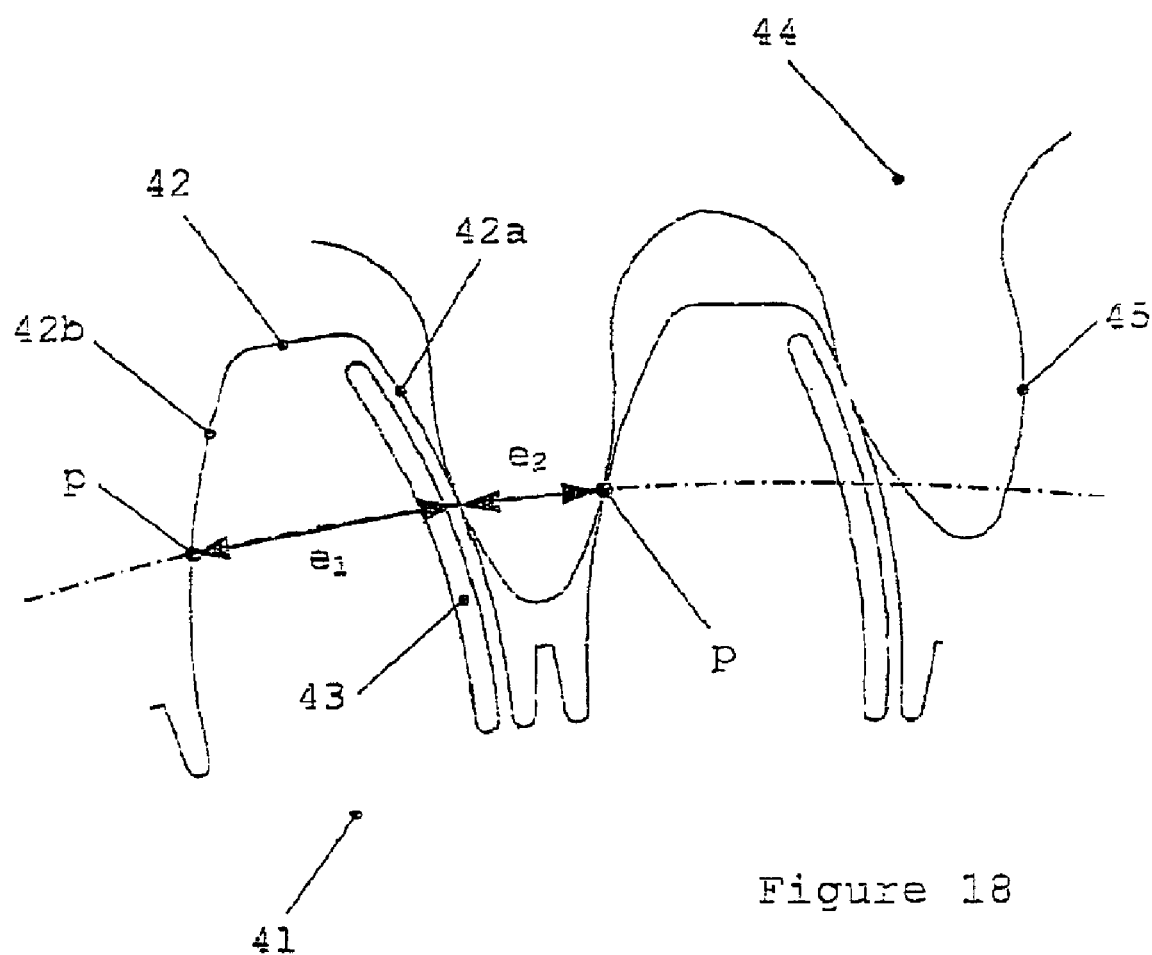

FIG. 1 is a perspective part view of a first embodiment;
FIG. 2 is a perspective part view of a variant of FIG. 1;
FIG. 3 is a perspective part of view a second variant of FIG. 1;
FIG. 4 is a perspective part view of a third variant of FIG. 1;
FIG. 5 is a perspective part view of a fourth variant of FIG. 1;
FIG. 6 is a perspective part view of a second embodiment;
FIG. 7 is a perspective part view of a variant of FIG. 6;
FIG. 8 is a perspective part view of another variant of FIG. 6;
FIG. 9 is a perspective part view of a third variant of FIG. 6;
FIG. 10 is a perspective part view of a fourth variant of FIG. 6;
FIG. 11 is a perspective part view of a third embodiment;
FIG. 12 is a perspective part view of a variant of FIG. 11;
FIG. 13 is a perspective part view of a second variant of FIG. 11;
FIG. 14 is a perspective part view of a fourth embodiment;
FIG. 15 is a perspective part view of a variant of FIG. 14;
FIG. 16 is a perspective part view of a fifth embodiment;
FIG. 17 is a diagram of the reaction torque on the axis of the toothed moving part measured as a function of its angle of rotation;
FIG. 18 is a view of an embodiment of the gear assembly which forms the subject of the present invention.

It should be pointed out by way of preamble that the present invention tackles the problem of backlash compensation in precision gear assemblies of very small mechanisms, in particular timepiece mechanisms, more specifically watch mechanisms, especially wristwatch mechanisms.

The size of the teeth in this type of mechanism varies within the following ranges: the height of the toothed wheel plates (or their thickness) is between 0.1 and 0.5 mm. The thickness e of the teeth measured along the pitch diameter typically varies between 0.05 mm and 0.3 mm, and the height (that is to say their radial dimension) varies from 0.15 mm to 0.6 mm.

Given these dimensions, it is clear that use should be made of suitable techniques to manufacture such teeth with one or two elastic portions. These techniques may be, in particular, electroforming, plasma dry etching used in microelectronics, chemical machining or etching, electrical discharge machining (using a wire or shaped electrode), and laser cutting.

Depending on the dimensions and the materials used, injection molding, sintering or water jet cutting may be employed.

The materials may be, for example, Ni, NiP, NiCo if using an electroforming process, silicon if using plasma dry etching, silicon or synthetic diamond with chemical machining, metals in the case of electrical discharge machining, plastic with injection molding, metal or ceramic powders for sintering, metals silicon or ceramics for laser cutting, and any material for water jet cutting.

In the light of this, a description will now be given of the various embodiments and variants of backlash-compensating toothed moving parts according to the present invention.

The embodiment of FIG. 1 shows three teeth 1 of a toothed moving part 2. Each tooth 1 has two elastic bending portions 3a, 3b which are symmetrical with respect to a radius r of the toothed moving part 2 passing through the tip of each tooth. The elasticity of the elastic portions 3a, 3b is imparted to them by a bell-shaped opening 4 centered on the radius r. The two portions 3a, 3b are terminated by two wider sections separated by a radial slot 5 centered on the radius r. The width of this radial slot 5 corresponds substantially to the engagement backlash to be compensated for.

In the case of backlash compensation, one of the elastic bending portions bends, until the slot 5 closes up, such that the two surfaces 6 and 7 defining this slot 5 constitute stop means limiting the displacement of the elastic bending portions 3a, 3b. When the two portions 3a, 3b abut, their bending moments combine and they can be dimensioned so that, when they combine, they offer a greater resistance to the torque to be transmitted between the two moving parts.

FIG. 2 shows a variant of FIG. 1 in which the two surfaces 6, 7 on either side of the radial slot 5 are not smooth but are shaped so as to prevent them from sliding relative to one another when they abut, which improves the rigidity of the tooth once the engagement backlash has been compensated for.

FIG. 3 shows another variant of FIG. 1 in which the slot 5 is replaced by two slots 5a, 5b of different respective widths. The narrower slot 5a is formed between two semicylindrical surfaces 8a, 8b which butt against one another before the other two surfaces 9a, 9b which define the slot 5b, thus causing the portions 3a, 3b to bend in their central section.

In the variant of FIG. 4, the elastic bending sections of the portions 3a, 3b are elongated and penetrate deeper into the moving part 2 than the bottom 10 of the inter-tooth space.

FIG. 5 relates to a variant in which an additional safety stop 11 is formed at the center of the opening 4, making it possible to limit the bending of the portions 3a, 3b after the slot 5 has closed up.

In the embodiment of FIG. 6, the two elastic bending portions 13a, 13b are formed around a central stop core 14, serving as a stop for the portions 13a, 13b, by two slots 15a, 15b. In this embodiment, the stop means are no longer situated essentially on the elastic bending portions 13a, 13b, but are exclusively formed by the core 14, the surface of which is essentially parallel to that of the external faces of the elastic bending portions 13a, 13b at rest, forming the external face of the tooth 12.

The variant of the embodiment of FIG. 6 illustrated by FIG. 7 constitutes the counterpart of the variant of FIG. 1 illustrated by FIG. 4.

FIG. 8 is a variant of the embodiment of FIG. 6 in which the two portions 13a, 13b are combined to form a single portion 13. In this variant, the fundamental difference stems from the fact that any elastic deformation of the portion 13 occurring on a flank of a tooth 12 causes a deformation of the other flank. Given this fact, it would be possible to envision having a toothed moving part in which only one tooth in two is a backlash-compensating tooth 12, the other tooth 12a being a solid tooth, as illustrated by the variant of FIG. 9.

The variant of FIG. 10 comes back to the concept of a tooth 12 having two portions 13a, 13b situated symmetrically with respect to the radius r of the moving part 12. However, in this variant, the two portions 13a, 13b are attached to the central stop core 14 by a connection 16 from either side of which the slots 15a, 15b start. By contrast, the elastic bending portions 13a, 13b are free at their ends adjacent to the bottom of the tooth 12.

FIG. 11 relates to an embodiment in which the tooth 17 is attached to the plate of the toothed moving part 18 by a bending web 19 formed inside the plate of the toothed moving part 18. A thicker intermediate section 20, arranged with clearance in a housing 21, serves as stop means with the walls of this housing 21. The base 17a of the tooth 17, on either side of the intermediate section 20, is parallel to the edge of the plate 18. The displacement of this tooth 17 is essentially a translational movement perpendicular to the radius r.

The variant illustrated by FIG. 12 is essentially distinguished by the fact that the stop means consist of two rims 18a arranged on either side of the root of the backlash-compensating tooth 17. The flexible web 19 here extends at the center of a cutout 22 in the plate of the wheel 18 and is extended into a cutout 23 formed in the tooth 17 and centered on the radius r passing through the tip of this tooth 17.

FIG. 13 relates to an embodiment which combines the concept of the embodiment of FIG. 11 with that of FIG. 9. The teeth 24 have an external portion 25, symmetrical with respect to the radius r, connected to the plate of the moving part 26 by two elastic bending webs 27a, 27b which extend inside two cutouts 28a, 28b which have a radial orientation in the plate of the moving part 26. A core 29 situated inside the external portion 25 constitutes the stop means which limit the displacement of the external portion 25.

In this embodiment, as in that of FIGS. 11 and 12, it would also be conceivable to produce a toothed moving part in which only one tooth in two is a backlash-compensating tooth, the other teeth being fixed teeth.

In the embodiment of FIGS. 14 and 15, the tooth 30 is connected to the plate of the toothed moving part 31 by an elastic bending tongue 32 and 33, respectively, which are designed to allow a tilting movement of the teeth 30 and no longer a translational movement. In this embodiment, it is the bases 34 and 35, respectively, of the teeth 30 which, during the tilting movement of these teeth 30, butt against the homologous adjacent surfaces 31a and 31b, respectively, of the plate of the respective wheels 31.

In the embodiment illustrated by FIG. 16, the symmetrical portions on either side of the radius r passing through the tips of the adjacent teeth join together and thereby form a toothed annular element 36 connected to the plate of the toothed moving part 37, which plate has the shape of a toothed wheel, by radial tongues 38, 39 which are respectively arranged at the tips of the teeth and at the bottom of each tooth. The stop means are formed by the lateral flanks of the tooth-shaped cores 40 of the plate 37 of the toothed moving part.

The diagram of FIG. 17 represents the results of a simulation carried out using a ball moving over a circular path corresponding to the pitch circle of the driving gear. This ball bears against the tooth portion elastically connected to the moving part. The reaction torque on the axis of rotation of the moving part is then measured as a function of the angle of rotation thereof. It is possible to observe an increase in the rigidity of the toothing starting from a rotation of ~0.2°-0.3°. It is observed that this effect is very distinct for the embodiment in which the stop means are formed by a solid core, as in the embodiment of FIG. 9, for example.

It is possible to choose with a large degree of freedom the slopes and slope change angle(s) of the reaction torque characteristic as a function of the displacement angle by adjusting the geometry, by adjusting the thickness of the elastic regions, by adjusting the dimension of the slots and by adjusting the spaces formed between the elastic sections and the rigid sections.

The gear assemblies of the embodiments represented in FIGS. 8, 11 to 16 do not have any outer catching regions and are thus less liable to destruction when they are being handled during manufacture or when they are being fitted.

The embodiment illustrated by FIG. 18 relates to a gear assembly in which one of the mating moving parts 41 has teeth 42 each comprising a slot 43 which is shaped so as to impart a substantially higher degree of elasticity to one of the contact faces 42a of these teeth than to their other contact face. Consequently, the more elastic contact face 42a is able to bend when it comes into contact with a tooth 45 of the other mating moving part 44. The other section of the tooth 42 that is integral with the less elastic contact face 42b can serve as a stop for the more elastic contact face 42a.

When such a gear assembly is used to compensate for the backlash between the mating moving parts 41, 44 of the gear assembly, the sum of the two linear thicknesses $e_1$, $e_2$ of the teeth 42, 45 of these mating moving parts 41, 44 measured along the pitch diameter of the backlash-compensating mating moving part 41 is at least equal to the pitch of this backlash-compensating moving part.

The pitch of the toothing corresponds to the length of an arc between the point p of a tooth of this toothing and the homologous point p' of an adjacent tooth of this same toothing.

The invention claimed is:

1. A backlash-compensating moving part for a precision gear assembly, particularly of a timepiece,
   said moving part comprising a central plate and a plurality of teeth, wherein said teeth include a plurality of backlash-compensating teeth,
   wherein each backlash-compensating tooth comprises:
      a central rigid portion provided integral with the central plate, and
      two elastically deformable portions which extend on respective sides of the rigid portion and which are connected elastically to the central plate so as to provide each of the elastically deformable portions with a respective freedom of movement in a plane of the moving part,
   wherein a respective first through slot is formed between the rigid portion and each of the elastically deformable portions, said respective first through slot having a respective width corresponding substantially to a respective backlash to be compensated for,
   and wherein free tips of said elastically deformable portions extend radially beyond a tip of the rigid portion and are separated from each other by a second through slot whose width is such that that the rigid portion serves as the only stop for each of the elastically deformable portions, so as to limit an amplitude of movement of each of the elastically deformable portions as a function of the respective backlash to be compensated for.

2. The moving part as claimed in claim 1, wherein the elastically deformable portions extend symmetrically with respect to a radius of the moving part passing through the tip of the tooth.

3. The moving part as claimed in claim 1, wherein the first slots separate the elastically deformable portions from the central portion, the profiles of the first slots being parallel to that of the tooth.

4. The moving part as claimed in claim 1, wherein the second slot is centered on a tip of the tooth.

5. The moving part as claimed in claim 1, wherein each of the elastically deformable portions extends radially inside the central plate and comprises a section arranged with clearance in a housing of the central plate.

6. The moving part as claimed in claim 1, wherein a height of the central plate is from 0.1 to 0.5 mm.

7. The moving part as claimed in claim 1, wherein a height of the tooth is from 0.15 mm to 0.6 mm.

8. The moving part as claimed in claim 1, wherein a thickness of the tooth along a pitch diameter of the moving part is from 0.05 mm to 0.3 mm.

9. The moving part as claimed in claim 1, which has been obtained using an electroforming method.

10. The moving part as claimed in claim 1, which comprises a material selected from the group consisting of Ni, NiP, and NiCo.

11. The moving part as claimed in claim 1, which has been obtained using a plasma dry etching method.

12. The moving part as claimed in claim 1, which comprises a silicon material.

13. The moving part as claimed in claim 1, which has been obtained using a chemical machining or etching method.

14. The moving part as claimed in claim 1, which has been obtained using an electrical discharge machining method.

15. The moving part as claimed in claim 1, which has been obtained using a laser cutting method.

\* \* \* \* \*